United States Patent [19]

Coenen et al.

[11] Patent Number: 4,647,336
[45] Date of Patent: Mar. 3, 1987

[54] REBUILDABLE SUPPORT ASSEMBLY

[75] Inventors: Joseph D. Coenen; Daniel A. Hansel, both of Outagamie County, Wis.

[73] Assignee: Kimberly-Clark Corporation, Neenah, Wis.

[21] Appl. No.: 709,621

[22] Filed: Mar. 8, 1985

[51] Int. Cl.$^4$ .................. B23K 1/06; B29C 65/08
[52] U.S. Cl. ..................... 156/580.1; 116/137 A; 228/1.1; 248/602; 248/612; 248/613; 248/DIG. 1
[58] Field of Search .............. 156/73.1, 73.3, 580.1, 156/580.2; 228/1.1; 425/174.2; 310/326, 322, 334; 116/137 A; 248/638, 613, 612, 602, DIG. 1

[56] References Cited

U.S. PATENT DOCUMENTS

| | | | |
|---|---|---|---|
| 3,128,071 | 4/1964 | Frazer-Nash | 246/602 |
| 3,210,724 | 10/1965 | Jones et al. | 228/1.1 |
| 3,350,582 | 10/1967 | Attwood et al. | 156/73.1 |
| 3,586,122 | 6/1971 | Jacke | 228/1.1 |
| 3,790,059 | 2/1974 | Jacke et al. | 228/1.1 |

Primary Examiner—Michael Wityshyn
Attorney, Agent, or Firm—Douglas L. Miller; Donald L. Traut; Jeremiah J. Duggan

[57] ABSTRACT

An assembly for providing support to a component, such as an ultrasonic component, including converters, boosters and horns which are subjected to continuous and repeated impacts and stresses. Such devices generally have integral nodal flanges for support purposes. In this assembly, shock-absorbing means are placed on each side of the nodal flange. A grip ring assembly is then bolted or otherwise removably fastened, together over the shock-absorbing means and nodal flange, compressing the shock-absorbing means. The component is prevented from rotating with respect to the grip ring assembly by pegs which are driven through holes provided in the grip ring assembly and into slots formed lengthwise in the nodal flange. Hence the flange itself, via the shock-absorbing means, absorbs all of the lengthwise force applied to the component by the grip ring assembly, and the pegs are required to absorb none of it. Consequently the problem of breakage of the pegs due to excessive lengthwise force thereon, and the resultant waste of the booster having such a broken peg, is solved by the invention disclosed herein.

7 Claims, 6 Drawing Figures

REBUILDABLE SUPPORT ASSEMBLY

BACKGROUND OF THE INVENTION

This invention relates to support assemblies, and in particular to rebuildable support assemblies for the various parts of an ultrasonic assembly including converters, boosters and horns.

Throughout the following, "ultrasonic" shall be used to include energy in both the sonic and ultrasonic ranges.

Recently ultrasonic apparatus have increased in economic importance with respect to bonding of disposables and non-woven products such as diapers, adult incontinence products and other items. It is common, for instance, to use ultrasonic welding in forming the buttonholes in adult incontinence products and longitudinal and perimeter seals on various disposable and sanitary products.

Certain ultrasonic bonding applications advantageously employ continuous sonics. With continuous sonics, the ultrasonic power remains on during machine operation, the horn remains in the lowered position, and a patterned anvil roll rotates beneath the horn to provide the desired bonding pattern. This structure is generally described in Persson, et al., U.S. Pat. No. 4,404,052. The design of this structure can cause certain problems, however. In particular, the rotation and repeated impacts of the anvil cause a substantial amount of shock and lateral loading on the assembly which supports the various portions of the apparatus, including the horn, the converter and the booster if one is used.

Existing support assemblies are generally formed at least partly integrally with the converter, horn or booster. For instance, it is common for a grip ring (a type of support assembly) to be fastened to the body of the component by means of pegs driven directly through the ring and into blind holes in the bodyor the flange portion thereof. This method causes these pegs to provide a substantial amount of vertical support to the component body, which makes the pegs very likely to break prematurely. If one of these pegs breaks, the portion of the peg remaining in the bodymust be drilled out. This is a very difficult job considering the fact that the pegs are constructed of a very hard material such as hardened steel or titanium in order to perform their function properly. Hence the entire component is often rendered worthless by the breakage of a single one of these pegs, a substantial waste.

This invention relates to solutions of the problems raised above, and to improvements to the devices described above.

SUMMARY OF THE INVENTION

The invention is intended to be applied to any component which is subjected to repeated impacts and lateral forces, and in particular to ultrasonic components such as converters, boosters and horns. In order to receive support, these components are generally manufactured having an integral flange at the node, or point of least lengthwise vibration. This flange shall hereinafter be referred to as the nodal flange. The invention includes the provision of two shock-absorbing devices, one above and one below the nodal flange. A grip ring assembly is then assembled over the shock-absorbing devices and nodal flange, so as to tightly grip the component. In one preferred embodiment a first support ring is slid over one end of the component. This first ring may have an L-shaped cross-section beneath which the shock-absorbing devices and nodal flange may fit. A second support ring may the be slid over the opposite end of the component and removably attached to the first ring. Finally, pegs may be inserted through the grip ring assembly and fitted into notches formed lengthwise in the nodal flange, for anti-rotational purposes. Hence if any portion of the assembly fails, the unit can more easily be rebuilt by disassembling and replacing the necessry parts. Further, since the pegs do not provide vertical support to the component body, because they rid in vertical slots in the nodal flange, they are less likely to fail.

It is thus an object of the invention to provide a support assembly for ultrasonic components, which assembly is easily and inexpensively rebuildable.

Another object of the invention is to provide a support assembly as described above having shock-absorbing means disposed within the grip ring assembly for transferring the force applied to the component by the grip ring assembly.

A more specific object of the invention is to provide a support assembly as described above having O-rings placed between the surfaces of the nodal flange and the grip ring assembly to absorb shock and reduce vibrational failure.

Another specific object of the invention is to provide a support assembly as described above having pegs passing through the grip ring assembly and fitting into slots in the nodal flange, for anti-rotational purposes.

DESCRIPTION OF THE PREFERRED EMBODIMENTS

Figure 1:
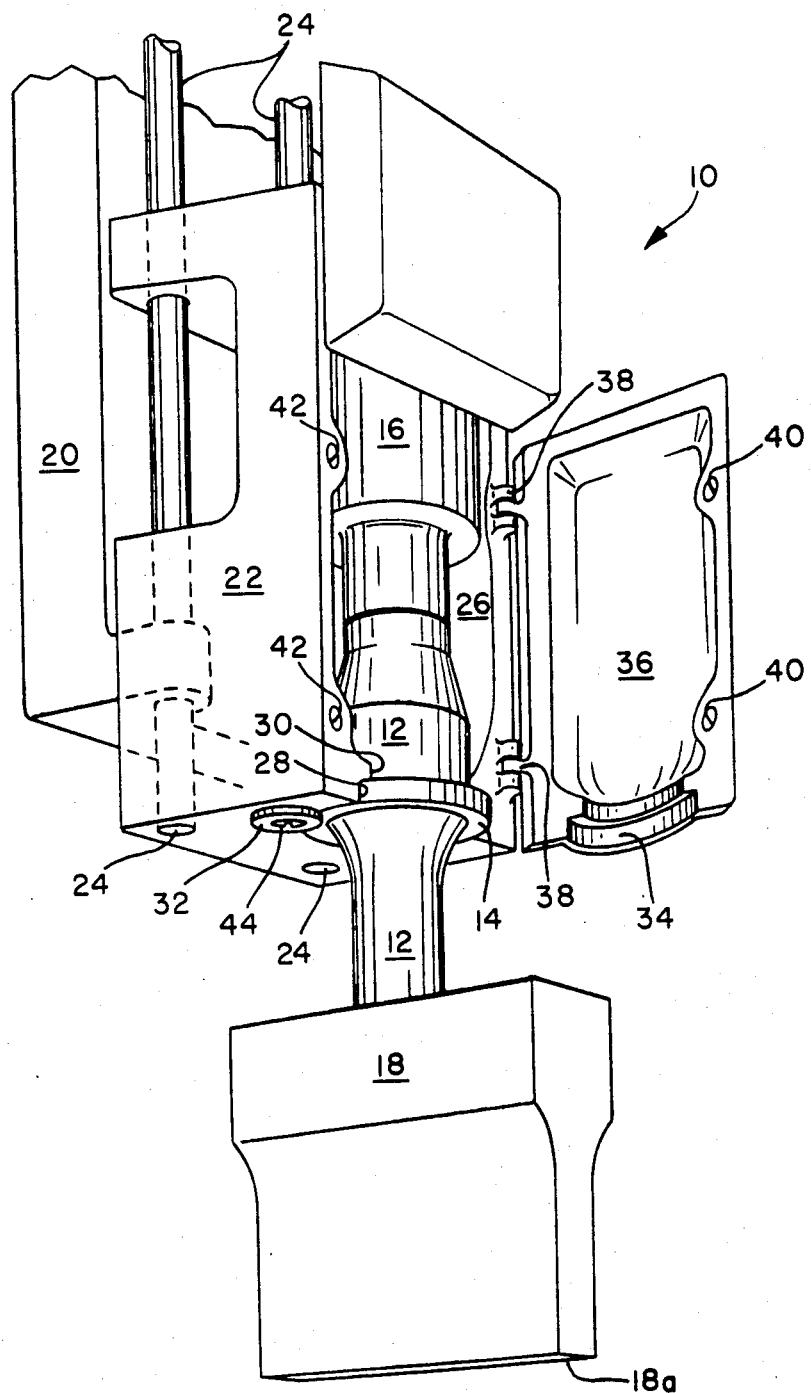
FIG. 1 is a view of the actuator assembly which holds the components therein.

Referring now to FIG. 1, there is shown a conventional assembly 10 for holding and positioning a component 12 having a grip ring 14. Component 12 could be any suitable component needing support and positioning, and having a grip ring 14 located about its girth. The component 12 shown in the figure is an ultrasonic booster. As shown in FIG. 1, booster 12 is removably attached at its top to an ultrasonic converter 16 and at its bottom to an ultrasonic horn 18. Conventionally, the converter 16 converts electrical energy to kinetic energy, that is, physical vibration, in the ultrasonic range. Booster 12 then increases the amplitude of this vibration basically by means of its shape, and transfers the energy to the horn 18. The opposite tip 18a of horn 18 is applied against a workpiece (not shown), supported by an anvil (not shown), to do such work as ultrasonic welding and cutting. In particular, a patterned anvil roll can be rotated beneath the horn, with the workpiece placed therebetween, to provide a desired bonding pattern. This type of application is called "continuous sonics"

because the power remains on during machine operation, the horn remains in the lowered position, and it is the anvil that provides the desired bonding pattern. This anvil structure is described generally in Persson, et al, U.S. Pat. No. 4,404,052, at FIG. 1 and column 3, lines 1–29, which is incorporated herein by reference.

As shown in FIG. 1 herein, assembly 10 includes a frame 20, only a part of which is shown, and an actuator carriage 22 which moves up and down with respect to frame 20 by means of tubes or rods 24 which pass through both frame 20 and carriage 22. Rods 24 are attached to one of the frame 20 and carriage 22 rigidly, while they are attached to the other of the two slideably. Inside actuator carriage 22 is formed a cavity 26 wherein the converter 16 and booster 12 are installed. The means of installation are as follows. Grip ring 14 is slid into a slot 28, beneath a lip 30, both of which are formed in cavity 26 for that purpose. A number of washers 32 are then bolted into the bottom of carriage 22, and extend partly under the area of slot 28 so as to hold grip ring 14 between themselves and lip 30. The front of grip ring 14 is supported by a slot 34 formed in a door 36, which is attached to actuator carriage 22 by hinges 38. Hence to install booster 12, grip ring 14 is slid into slot 28, and door 36 is closed and bolted shut via apertures 40 in door 36 and apertures 42 in carriage 22. Converter 16 is held in carriage 22 similarly. Consequently as actuator carriage 22 moves up and down, booster 12, converter 16 and horn 18 also move up and down, and horn 18 moves into and out of engagement with the workpiece (not shown).

Figure 3:
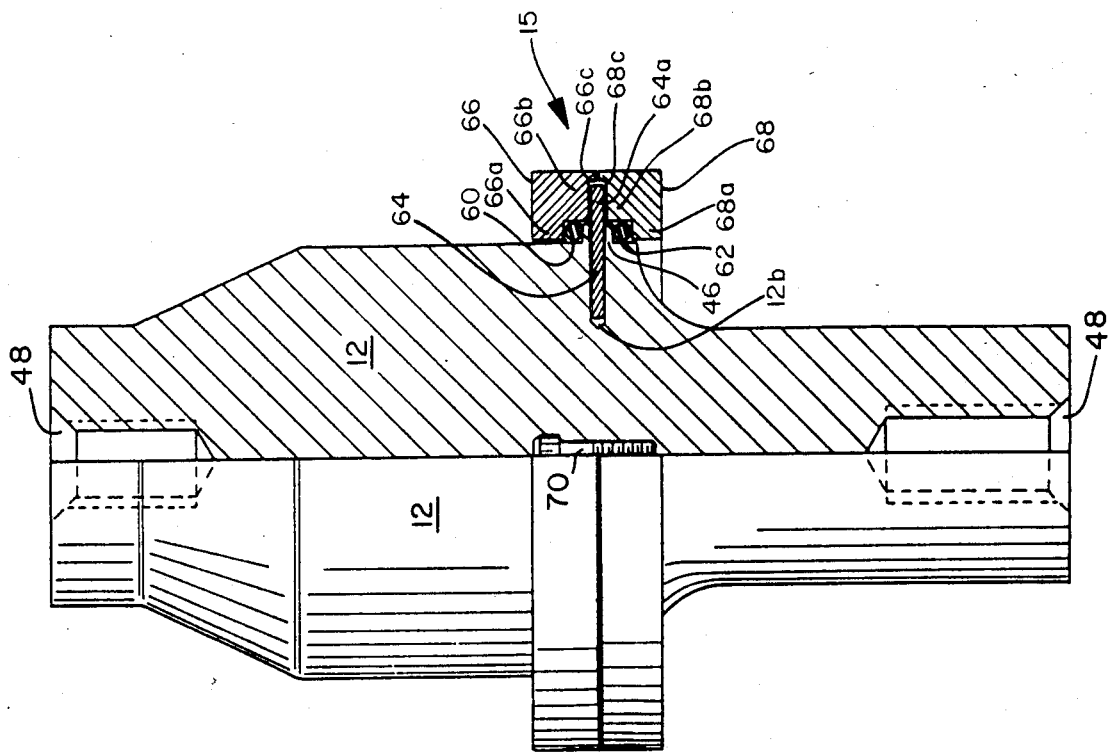
FIGS. 2 and 3 are side views of grip ring assemblies known in the prior art.
Figure 2:
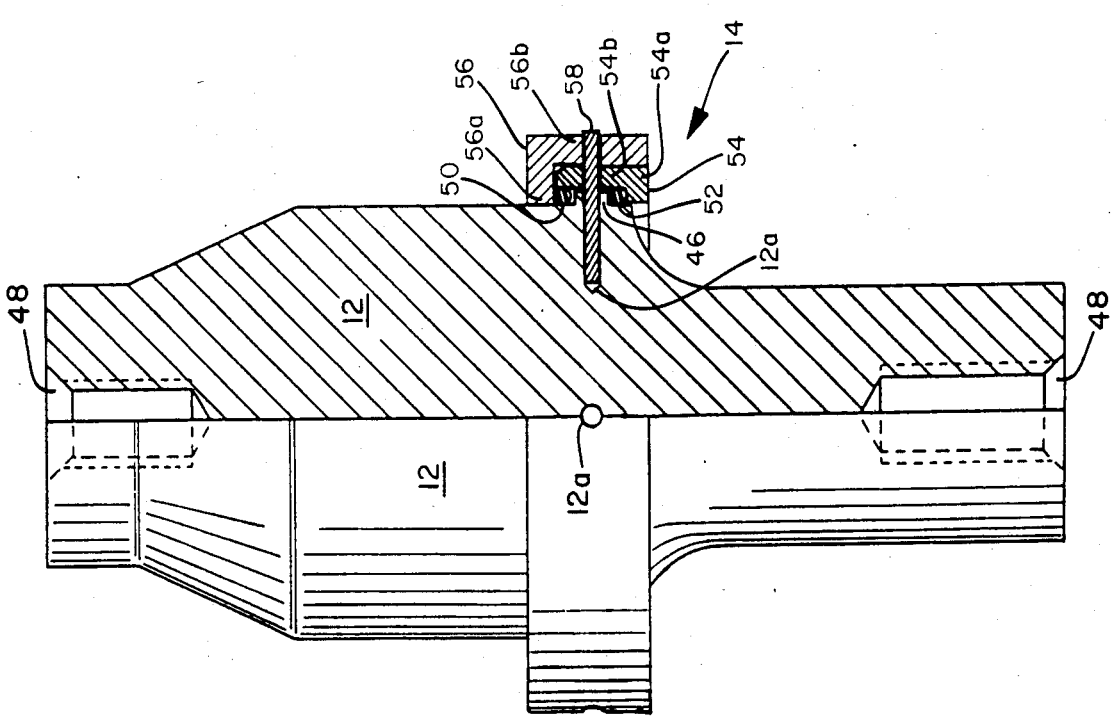

Conventional constructions of grip ring 14 and 15 are shown in FIGS. 2 and 3 respectively. In each figure, booster 12 is provided with an integral flange 46 which is located at the node, or point of least lengthwise vibration, of booster 12, and is hereinafter referred to as the "nodal flange". Booster 12 is also provided with a tapped hole 48 at each end for use in attaching it to the converter 16 and horn 18 as shown in FIG. 1.

Referring now particularly to FIG. 2, the conventional grip ring assembly 14 there shown, labeled "Prior Art," includes an O-ring 50 applied about the girth of booster 12 above nodal flange 46, and another O-ring 52 applied similarly below nodal flange 46. A lower ring 54 having an L-shaped cross-section is applied to booster 12 from the bottom, and is sized so that the portion 54a having the smaller inside diameter fits over booster 12 while the portion 54b having the larger inside diameter fits over nodal flange 46. An upper ring 56, again having an L-shaped cross-section, is fitted over lower ring 54, such that the portion 56a having the smaller inside diameter fits over booster 12 while the portion 56b having the larger inside diameter fits outside lower ring 54. The lower edges of the two rings 54 and 56 usually align with each other. When the rings are so assembled, a plurality of holes 12a are drilled horizontally through the rings and into flange 46, and continuing a substantial distance into the body of booster 12. A peg 58 is inserted fully in each of holes 12a, the outer end of each such peg being approximately flush with the outer surface of upper ring 56. As used hereinafter, the word "peg" shall include any elongated driveable holding means including roll pins, drive pins, spring pins and dowel pins.

There are several disadvantages inherent in this arrangement. First, since holes 12a are generally drilled after assembly of rings 54 and 56, the holes are being drilled blindly, and the likelihood of missing part of flange 46 and hitting one of O-rings 50 and 52 is high. Second, as can be seen in FIG. 2, the pressure of rings 54 and 56 on O-rings 50 and 52 may be affected and even negated by the likely poor placement of hole 12a as described above since lower ring 54 may actually prevent upper ring 56 from contacting, not to mention compressing, upper O-ring 50. Finally and most important, in this arrangement pegs 58, which are designed mainly as anti-rotational means, receive most of the burden of bearing the vertical pressure exerted by actuator carriage 22 (FIG. 1) on booster 12, relieving flange 46 of this pressure. This causes increased breakage of pegs 58, and it must be kept in mind that drilling out or otherwise removing a broken peg 58 is so difficult and expensive that the booster 12 is rendered worthless by any such breakage.

Referring now to FIG. 3, another conventional grip ring assembly 15 is there shown. As in FIG. 2, booster 12 has an integrally formed nodal flange 46. O-rings 60 and 62 are applied to booster 12, one each above and below flange 46. A plurality of holes 12b is then drilled or otherwise formed horizontally into flange 46 and continuing a substantial distance into booster 12, and a peg 64 driven fully into each hole 12b. Each such peg 64 protrudes out of hole 12b a short distance 64a. Upper and lower grip rings 66 and 68 are then applied. These grip rings are similar to each other in that each has an L-shaped cross-section, with the smaller inside diameter portions 66a and 68a just fitting over booster 12 and the larger inside diameter portions 66b and 68b just fitting over flange 46. In addition each ring 66 and 68 is provided with a plurality of semi-cylindrical openings 66c and 68c in the face thereof which faces the opposite ring, such that when the two rings are applied to the booster 12, a plurality of cylindrical openings which fit over the peg protrusions 64a are formed. The number of cylindrical openings of course corresponds to the number of pegs 64. Rings 66 and 68 are then usually connected together by means of screws or bolts 70 inserted through one ring and threaded into the other. These screws or bolts 70 are spaced about rings 66 and 68. While this arrangement provides solutions to the first two problems described above referring to the apparatus shown in FIG. 2, the third and most important problem remains. That is, pegs 64 still carry a substantial amount of the vertical pressure applied to booster 12 by actuator carriage 22 (FIG. 1). This in turn increases the likelihood of breakage of pegs 64. Since pegs 64 are driven into blind holes 12b and are made of a hardened material such as hardened steel or titanium, removal of a broken peg 64 by drilling or other means is difficult and expensive, and so again booster 12 is rendered worthless by the breakage of a single peg 64.

Figure 4:
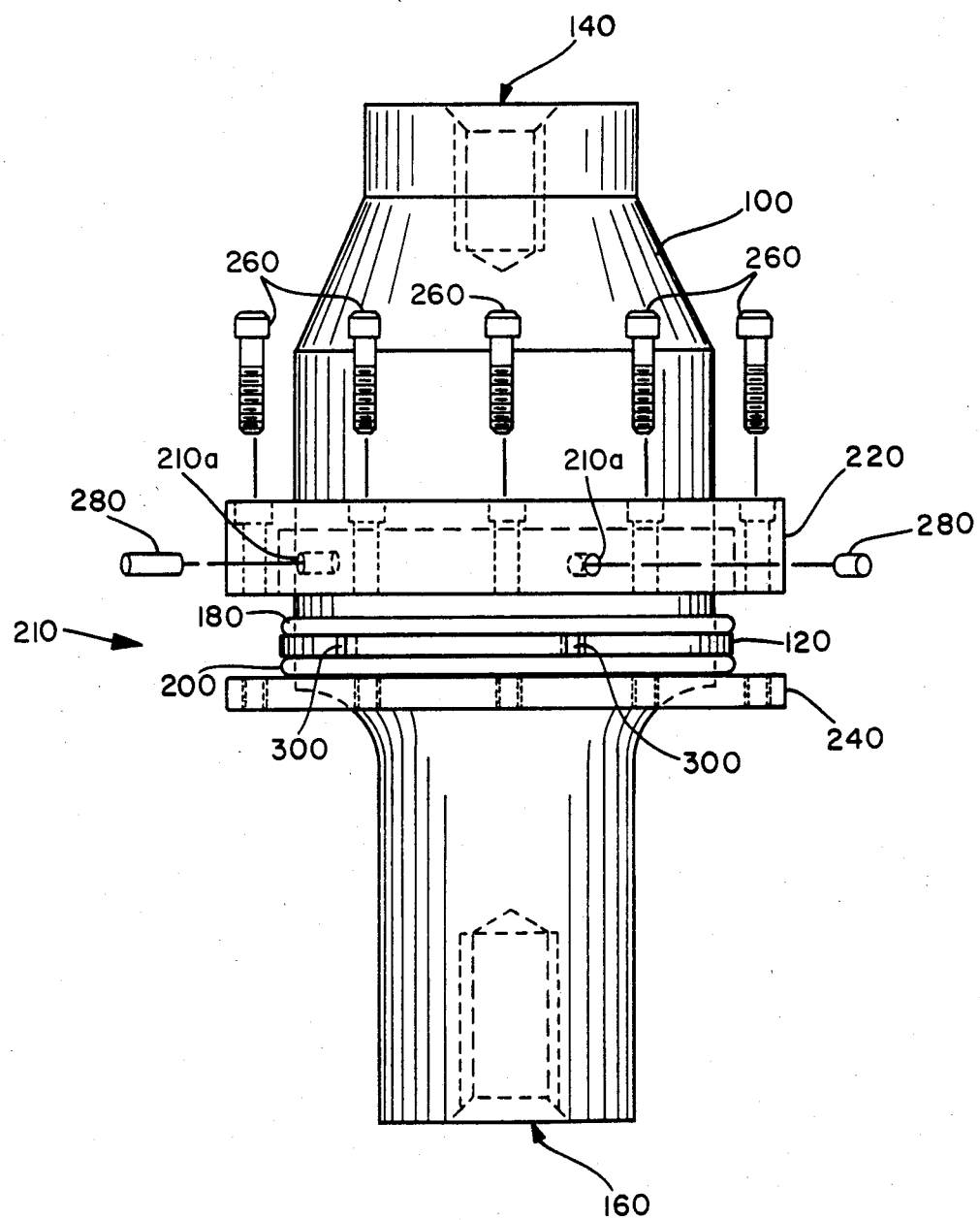
FIG. 4 is an explosed view of one embodiment of the invention as applied to an ultrasonic booster.
Figure 5:
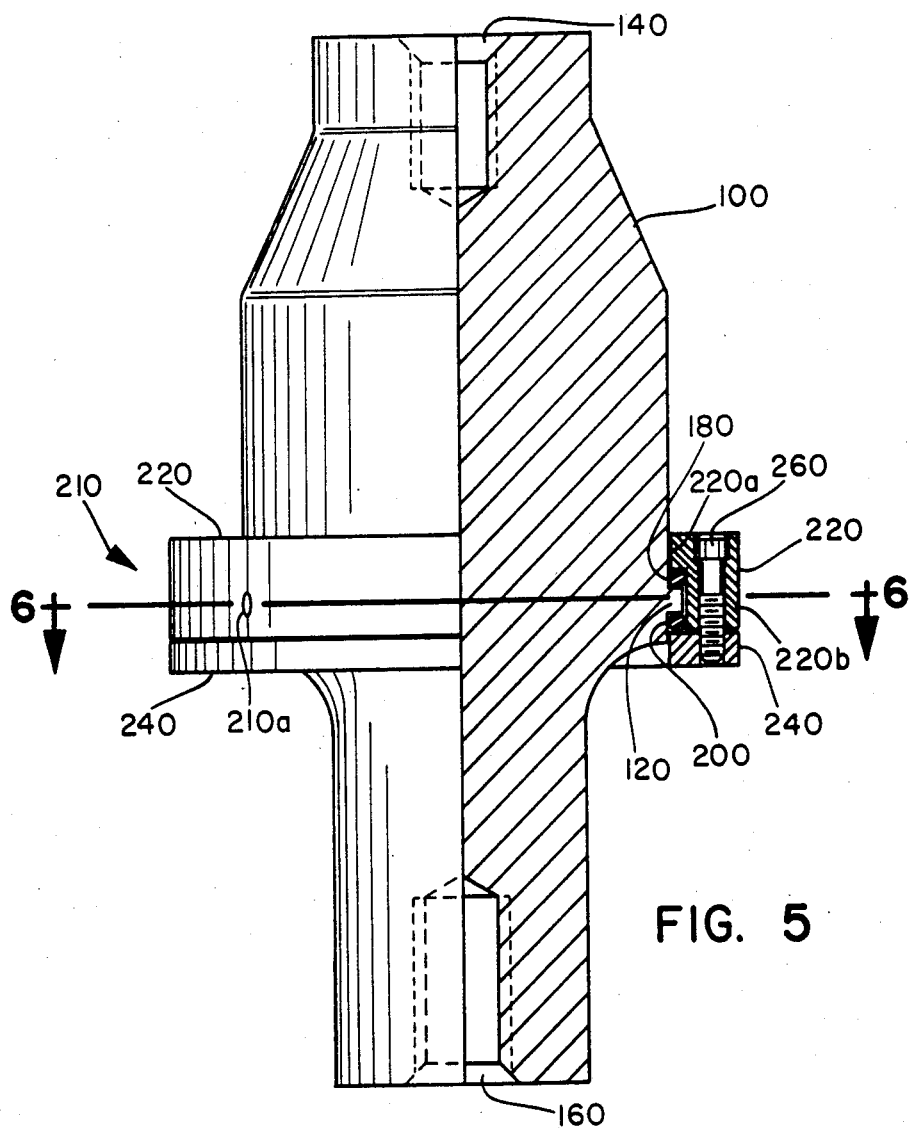
FIG. 5 is a side view, partially in section, of an assembly embodying the invention as applied to an ultrasonic booster.
Figure 6:
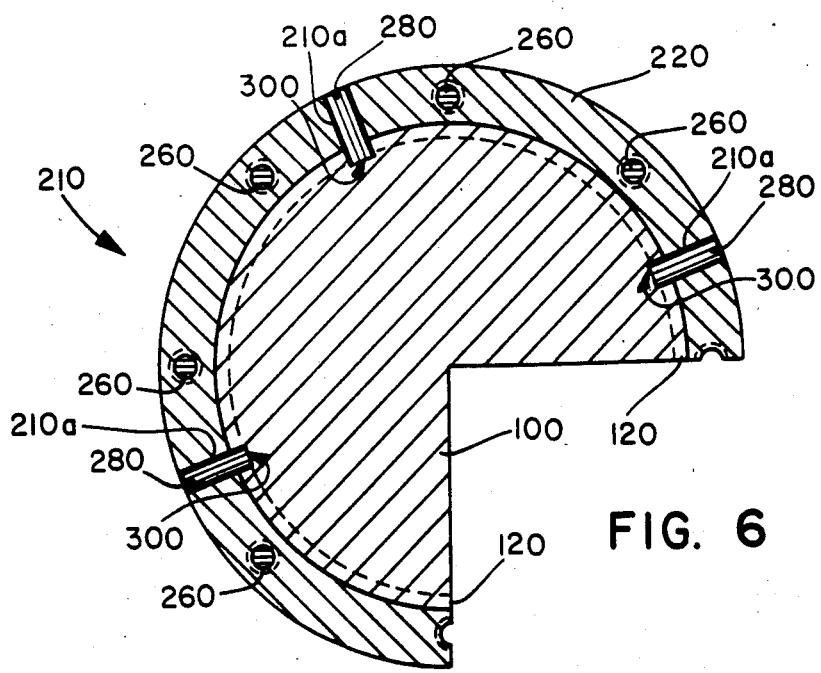
FIG. 6 is a sectional view of FIG. 5 taken along line 6—6.

Referring now to FIGS. 4, 5 and 6, showing one embodiment of the invention, wherein the above-described problems are solved, there is shown an ultrasonic booster 100, having an integrally formed nodal flange 120. While the description of the invention as follows refers mainly to an ultrasonic booster, the invention applies equally well to any type of component having a flange provided about its circumference for support, and particularly to a support assembly for any ultrasonic components such as a converter or a horn. The booster body 100 may also have apertures 140 and 160, one at each end, which may be tapped and used to attach the component to the other parts of the assembly as shown in FIG. 1.

As shown in FIGS. 4, 5 and 6, shock-absorbing means 180 and 200 are applied about the circumference of booster body 100, both above and below nodal flange 120. These shock-absorbing means may include a resilient, injectable material injected after the grip ring assembly 210 described below is completed, or lengths of resilient material applied to the flange 120. In the most preferred embodiment, shock-absorbing means 180 and 200 are O-rings having a durometer measurement of 90 such as those manufactured by National O-rings, Inc., of a fluorocarbon material marketed under the trademark "VITON".

In the preferred embodiment, the grip ring assembly 210, as referred to above, is provided in a plurality of parts which are assembled over shock-absorbing means 180 and 200 and nodal flange 120. Any suitable assembly can be provided such that nodal flange 120 is tightly held therein and such that a suitable surface for mounting the component into slots 28 and 34 of carriage 22 (FIG. 1) is provided. In the most preferred embodiment grip ring assembly 210 may include an upper grip ring 220 and a lower grip ring 240. As shown best in FIG. 5, one of the grip rings, in that figure lower grip ring 240, may have a rectangular cross-section. If that is the case then the opposite ring, in that figure upper ring 220, may have an L-shaped cross-section, that is, a plurality of inside diameters. A smaller one 220a is just greater than the circumference of booster body 100, and a large one 220b is just greater than the circumference of nodal flange 120. The larger portion 220b may span the shock-absorbing means 180 and 200 and the nodal flange 120, less a certain allowance for compression of the shock-absoring means. The most preferred embodiment allows for about ten percent compression of these shock-absorbing means 180 and 200. Considering this compression, then, upper ring 220 and lower ring 240 are then assembled by any easily removable means, such as threaded fasteners 260, which may be threaded directly into one of the grip rings as shown in FIG. 5, or nuts (not shown) may be used.

Finally, means for preventing the rotation of booster 100 with respect to grip ring assenmbly 210 will often be desirable. As shown best in FIGS. 4 and 6, these means may be provided by one or more pegs 280 which connect to grip ring assembly 210 and fit into slots 300 formed lengthwise (vertically in FIG. 4) in nodal flange 120 for that purpose. These pegs 280 may be formed integrally with grip ring assembly 210. Preferably, however, these pegs are roll pins, spring pins, drive pins or dowel pins which are driven through holes 210a formed in grip ring assembly 210 for that purpose, which pegs fit into slots 300. As can be seen in FIG. 6, pegs 280 are not driven into the body of booster 100, but rather stop at the inner edge of flange 120. Since slots 300 are formed lenthwise in flange 120, that is, vertically as shown in FIG. 4, pegs 280 provide no vertical support between booster 100 and grip ring assembly 210, only anti-rotational support as desired. All vertical pressure is transferred from the grip ring assembly 210 to booster 100 via shock-absorbing means 180 and 200 and nodal flange 120. The result is more accurate placement of horn 18 (FIG. 1) and improved repairability and rebuildability in the event of failure of any of the parts described above. Most important, a substantial reduction of the incidence of failure is realized. The incidence of failure is reduced because the problem existing in the prior art, that is, that the pegs were required to bear some of the vertical pressure exerted on the component, is removed with the improvement described herein. Further, original assembly of the grip ring assembly to the booster is facilitated, and the pressure exerted on the shock-absorbing means can be more closely regulated. Finally, in the event one of the pegs does break, it can easily be removed from or driven out of the grip ring assembly and replaced.

While the apparatus hereinbefore described is effectively adapted to fulfill the aforesaid objects, it is to be understood that the invention is not limited to the disclosed embodiments of rebuildable ultrasonic support assembly. Rather it is to be taken as including all reasonable equivalents within the scope of the appended claims.

What is claimed is:

1. In an ultrasonic apparatus for bonding nonwoven products, such as diapers, incontinent garments, sanitary items, and the like; and including an ultrasonic converter for converting electrical energy to vibrational kinetic energy, an ultrasonic horn for receiving boosted vibrational kinetic energy, and a generally elongate ultrasonic booster having a longitudinal axis and being connected between said ultrasonic converter and said ultrasonic horn for boosting the vibrational kinetic energy of said ultrasonic converter; an ultranoic support assembly for supporting said ultrasonic apparatus, comprising:

a generally circular modal flange member peripherally disposed radially outwardly about said general elongate ultrasonic booster and having a radially outer surface, said nodal flange member being generally planar with an axis generally perpendicular thereto and generally parallel to the longitudinal axis of said ultrasonic booster, an ultrasonic shock-absorbing means peripherally disposed with said generally circular nodal flange member, a grip ring means peripherally disposed about said generally circular nodal flange member and said ultrasonic shock-absorbing means for compressively connecting said nodal flange member and said ultrasonic shock-absorbing means together, an antirotational means for preventing relative rotation between said grip ring means and said generally circular nodal flange member, said antirotational means comprising a plurality of antirotational pin members radially connected between said grip ring means and said generally circular nodal flange member, and a pressure-relief means in said generally circular nodal flange member for eliminating application of longitudinally applied compressive forces against said antirotational pin members, whereby the longitudinally applied compressive forces are absorbed or supported by said grip ring means alone.

2. The ultrasonic apparatus of claim 1 wherein said pressure-relief means comprises a plurality of grooved slots disposed lengthwise in said radially outer surface of said nodal flange member such that longitudinal axes of said grooved slots are generally parallel to the axis of said nodal flange member, and said antirotational pin members are longitudinally slidably received in respective ones of said grooved slots, whereby said antirotational pin members may slide in respective said grooved slots when compressive forces are longitudinally applied to said grip ring means.

3. The ultrasonic apparatus of claim 2 wherein said grooved slots radially penetrate only said nodal flange member and not any portion of said ultrasonic booster.

4. The ultrasonic apparatus of claim 3 wherein said nodal flange member is integral with said ultrasonic booster.

5. The ultrasonic apparatus of claim 1 wherein said grip ring means comprises two grip rings, one of said grip rings being generally rectangular in cross-section, the other of said grip rings being generally L-shaped in cross-section and having one portion thereof longitudinally spanning said generally circular nodal flange member and said ultrasonic shock-absorbing means.

6. The ultrasonic apparatus of claim 5 wherein said antirotational pin members are integral with said other grip ring.

7. The ultrasonic apparatus of claim 6 wherein said ultrasonic shock-absorbing means is O-rings disposed on both sides of said nodal flange member.

* * * * *